(12) United States Patent
Sabin et al.

(10) Patent No.: US 10,114,678 B2
(45) Date of Patent: Oct. 30, 2018

(54) TECHNIQUES FOR MANAGING SERVICE DEFINITIONS IN AN INTELLIGENT WORKLOAD MANAGEMENT SYSTEM

(75) Inventors: Jason Allen Sabin, Lehi, UT (US); Michael John Jorgensen, Mapleton, UT (US); Nathaniel Brent Kranendonk, Springville, UT (US); Kal A. Larsen, Springville, UT (US); Stephen R Carter, Spanish Fork, UT (US)

(73) Assignee: Micro Focus Software Inc., Wilmington, DE (US)

( * ) Notice: Subject to any disclaimer, the term of this patent is extended or adjusted under 35 U.S.C. 154(b) by 742 days.

(21) Appl. No.: 12/789,799

(22) Filed: May 28, 2010

(65) Prior Publication Data

US 2011/0231846 A1    Sep. 22, 2011

Related U.S. Application Data

(60) Provisional application No. 61/315,860, filed on Mar. 19, 2010.

(51) Int. Cl.
| | | |
|---|---|---|
| *G06Q 10/00* | (2012.01) | |
| *G06F 9/455* | (2018.01) | |
| *G06F 9/46* | (2006.01) | |
| *G06F 9/50* | (2006.01) | |

(52) U.S. Cl.
CPC .................. *G06F 9/5072* (2013.01)

(58) Field of Classification Search
CPC .................................................. G06F 9/5072
USPC ........................................................ 705/7.27
See application file for complete search history.

(56) References Cited

U.S. PATENT DOCUMENTS

| | | | |
|---|---|---|---|
| 5,438,528 A * | 8/1995 | Emerson ................. | G06F 11/22 370/241 |
| 7,032,003 B1 * | 4/2006 | Shi et al. ....................... | 709/203 |
| 7,069,401 B1 * | 6/2006 | Noonan .............. | G06F 11/1461 707/999.202 |
| 7,149,884 B2 * | 12/2006 | O'Connor et al. ............... | 713/1 |
| 7,308,703 B2 * | 12/2007 | Wright et al. .................... | 726/1 |
| 7,464,366 B2 | 12/2008 | Shukla et al. | |
| 7,577,848 B2 * | 8/2009 | Schwartz et al. ............. | 713/187 |
| 7,711,694 B2 | 5/2010 | Moore | |
| 8,074,218 B2 * | 12/2011 | Eilam et al. ...................... | 718/1 |
| 8,624,905 B2 * | 1/2014 | Lee ....................... | G06F 1/3203 345/502 |
| 8,739,169 B2 * | 5/2014 | Bonilla ................... | G06F 9/505 709/201 |

(Continued)

OTHER PUBLICATIONS

RPath whitepaper (rBuilder and the rPath Appliance Platform, 2007).*

(Continued)

*Primary Examiner* — Beth V Boswell
*Assistant Examiner* — Folashade Anderson
(74) *Attorney, Agent, or Firm* — Schwegman Lundberg & Woessner, P.A.

(57) ABSTRACT

Techniques for managing service definitions in an intelligent workload management system are provided. Workloads and software products are assembled as a single unit with custom configuration settings. The single unit represents a recallable and reusable service definition for a service that can be custom deployed within designated cloud processing environments.

6 Claims, 4 Drawing Sheets

(56) References Cited

U.S. PATENT DOCUMENTS

| | | | |
|---|---|---|---|
| 8,990,813 B2* | 3/2015 | Frields | G06F 9/45533 |
| | | | 709/223 |
| 9,424,429 B1* | 8/2016 | Roth | G06F 21/45 |
| 2002/0035558 A1* | 3/2002 | Miyamoto | 707/1 |
| 2002/0169648 A1* | 11/2002 | Zara et al. | 705/8 |
| 2003/0171961 A1 | 9/2003 | Hosali et al. | |
| 2009/0132463 A1 | 5/2009 | Ducos | |
| 2009/0157419 A1 | 6/2009 | Bursey | |
| 2009/0300151 A1* | 12/2009 | Friedman et al. | 709/222 |
| 2010/0042484 A1* | 2/2010 | Sipes et al. | 705/14.4 |
| 2010/0115342 A1* | 5/2010 | Shigeta | G06F 11/3688 |
| | | | 714/37 |
| 2011/0126197 A1* | 5/2011 | Larsen | H04L 9/3213 |
| | | | 718/1 |
| 2011/0213687 A1* | 9/2011 | Ferris et al. | 705/34 |
| 2011/0231822 A1* | 9/2011 | Sabin et al. | 717/124 |
| 2011/0282476 A1* | 11/2011 | Hegemier et al. | 700/100 |
| 2012/0185913 A1* | 7/2012 | Martinez | G06F 9/455 |
| | | | 726/1 |
| 2012/0311128 A1* | 12/2012 | Pechanec | G06F 11/3414 |
| | | | 709/224 |

OTHER PUBLICATIONS

Novell unveils strategy and roadmap to lead in intelligent workload management market. (Dec. 8, 2009). PR Newswire Retrieved from https://dialog.proquest.com/professional/docview/676076205?accountid=142257 (Year: 2009).*

* cited by examiner

TECHNIQUES FOR MANAGING SERVICE DEFINITIONS IN AN INTELLIGENT WORKLOAD MANAGEMENT SYSTEM

RELATED APPLICATIONS

The present application is a non-provisional application of and claims the benefit of priority under 35 U.S.C. 119(e) to U.S. Provisional Patent Application Ser. No. 61/315,860, filed Mar. 19, 2010, and entitled "Techniques for Managing Service Definitions in an Intelligent Workload Management System;" the disclosure of which is incorporated herein by reference in its entirety.

BACKGROUND

While workloads are distinct units of work where a specific function is provided (e.g., an Simple Mail Transfer Protocol (SMTP) gateway) a service is a collection of cooperating workloads (e.g., a mail system comprised of an SMTP gateway, Internet Management Access Protocol version 4 (IMAP4) mail interface, Post Office Protocol version 3 (POP3) mail interface). While these services can be handcrafted what is needed is an automated way to assist in the creation of such services.

SUMMARY

Various embodiments of the invention provide techniques for managing service definitions in an intelligent workload management system. Specifically, a method for managing service definitions in an intelligent workload management system is presented.

DETAILED DESCRIPTION

Figure 1:
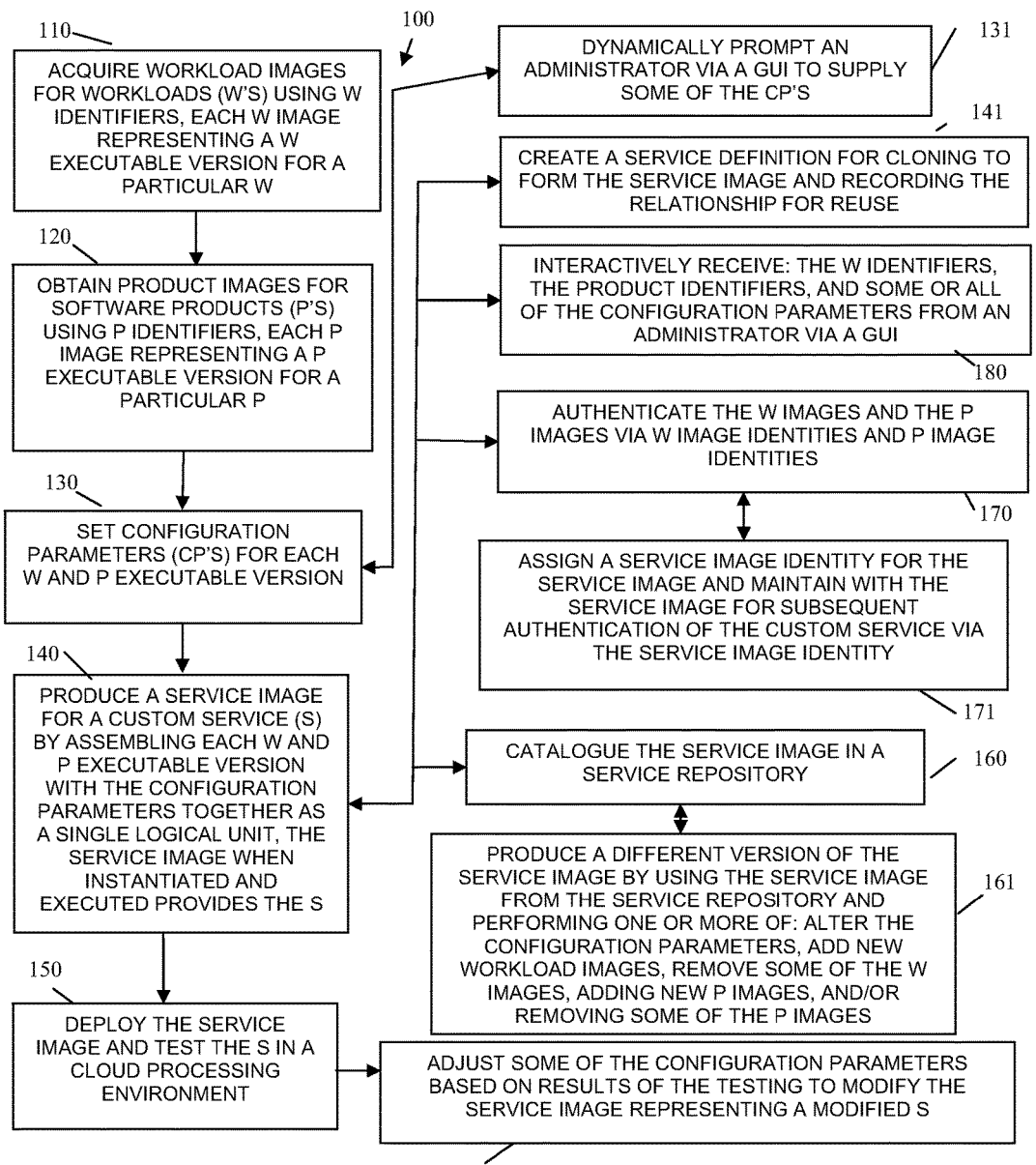
FIG. 1 is a diagram of a method for managing service definitions in an intelligent workload management system, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above. The phrase "software product" refers to independent software products that are independent of the workloads and that provides features to the workloads, such as but not limited to directory services, network services, and the like.

A "workload" refers to a task, a function, and/or a distinct unit of work that is processed within a workflow management system.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

Embodiments and components of the invention are implemented and reside in a non-transitory computer-readable medium that executes on one or more processors that are specifically configured to process the embodiments and components described herein and below.

FIG. 1 is a diagram of a method 100 for managing service definitions in an intelligent workload management system, according to an example embodiment. The method 100 (hereinafter "workload management service manager") is implemented and resides within a non-transitory computer-readable or processor-readable medium that executes on one or more processors of a network. Moreover, the workload management service manager is operational over a network and the network may be wired, wireless, or a combination of wired and wireless.

At 110, the workload management service manager acquires workload images for workloads using workload identifiers. Again, each workload representing a distinct unit of work (such as a task) for a workflow being processed within a workflow management system. Moreover, each image representing an executable version for a particular one of the workloads. In other words, each image is the installable instructions that can be executed on a processing device to provide the distinct unit of work that the image represents (the workflow that the image represents). Identifiers for the workload can be used to locate the corresponding images from a workload image repository or directory.

At 120, the workload management service manager obtains product images for software products using software product identifiers. Each software product image represents an executable version for a particular software product. So, in the manner described above with reference to 110, the workload management service manager also obtains software product image data using the software product identifiers from a software product repository or directory.

At 130, the workload management service manager sets configuration parameters for each workload executable version and for each software product executable version. For example, Domain Name System (DNS) servers can be identified, security protocols identified and set, identity services that are to be used for authentication identified, and the like. These configuration settings are customized for the existing combination of workloads and software products being assembled.

According to an embodiment, at 131, the workload management service manager dynamically prompts an administrator via a graphical user interface (GUI) tool to supply some or all of the configuration parameters. Thus, direct administrative customization is achieved for the combination of workloads and software products.

At 140, the workload management service manager produces a service image for a custom service by assembling each workflow executable version and each software product executable version together with the configuration parameters to form a single logical unit or reference for the custom service. The service image when instantiated and executed provides the custom service.

Continuing with 140 and in one case at 141, the workload management service manager creates a service definition data structure. The service definition data structure establishes a relationship for cloning instances of the workloads and the software products with the configuration parameters to form the service image. The workload management service manager also records the relationship for subsequent dynamic reuse with one or more cloud processing environments having one or more workflow management systems processing therein.

According to an embodiment, at 150, the workload management service manager deploys the service image and tests the custom service in a particular cloud processing environment. The deployment scheduling, the specific cloud processing environment, and the tests to be performed can all be automatically determined by evaluation of policy or based on a profile. The policy and/or the profile can be identity-based, meaning an identity for the administrator, the cloud processing environment, and/or the custom service can drive the selection of the policy and/or the profile.

Continuing with the embodiment of 150 and at 151, the workload management service manager adjusts some of the configuration parameters based on results of the testing to modify the service image and create a modified custom service. Essentially, the custom service is interactively and dynamically enhanced over time based on a dynamic feedback loop were results from tests are evaluated and adjustments are made to the configuration parameters defining the custom service image.

In an embodiment, at 160, the workload management service manager catalogues the service image in a service repository. This is done for reuse and centralized management and control of the custom service.

Continuing with the embodiment of 160 and at 161, the workload management service manager can subsequently produce different versions of the service image for the service repository by: altering the configuration parameters; adding new workload images; removing some of the workflow images; adding new software products; and/or removing some of the software products. So, the custom service can be recalled and edited to form different versions of the custom service. This leverages knowledge within an enterprise by capturing the one-off applications that may from time to time occur in a repository and using the automated mechanism described for managing service definitions thereby permitting automatic recall, reuse, and customization.

In another situation, at 170, the workload management service manager authenticates the workflow images and the software product images via workflow identities and software product identities. This can be achieved via an identity service or third-party authentication application.

Continuing with the embodiment of 170 and at 171, the workload management service manager assigns a service image identity for the service image and maintains that identity with the service image for subsequent authentication of the custom service, achieved via the service image identity. Here, a variety of other security mechanisms can be used to validate or authenticate the identity, such as a checksum, a digital signature, an assertion, and the like.

In another scenario, at 180, the workload management service manager interactively receives the workflow identifiers, the software product identifiers, and at least some of or all of the configuration parameters from an administrator that interacts with the workload management service manager via a GUI tool.

It is noted that in some embodiments each aspect of the workload management service manager may receive direction from an administrator via the GUI tool.

Figure 2:
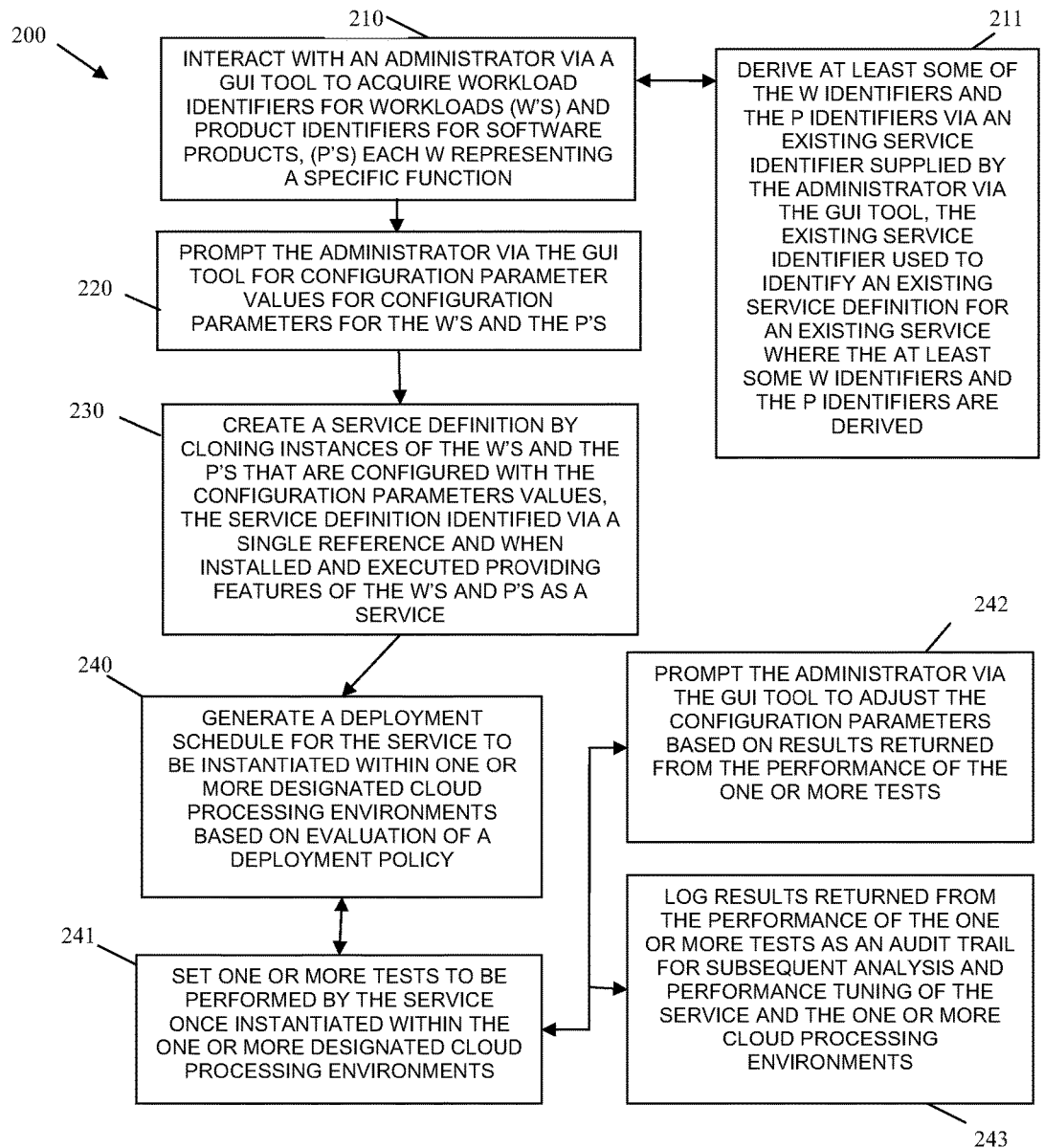
FIG. 2 is a diagram of another method for managing service definitions in an intelligent workload management system, according to an example embodiment.

FIG. 2 is a diagram of another method 200 for managing service definitions in an intelligent workload management system, according to an example embodiment. The method 200 (hereinafter "service manager") is implemented and resides within a non-transitory computer-readable or processor-readable medium that executes on one or more processors of a network. Moreover, the service manager is operational over a network and the network may be wired, wireless, or a combination of wired and wireless.

The service manager presents another and in some cases enhanced perspective of the workload management service manager represented by the method 100 of the FIG. 1 and discussed in detail above.

At 210, the service manager interacts with an administrator (type of principal) via a GUI tool for purposes of acquiring workload identifiers for workloads and product identifiers for software products. Again, each workload representing a specific function or distinct unit of work.

According to an embodiment, at 211, the service manager derives at least some of the workflow identifiers and the product identifiers from an existing service identifier supplied by the administrator via the GUI tool. The existing service identifier is used by the service manager to identify an existing service definition (such as from a service repository/directory) for an existing service and the workflow identifiers and the product identifiers, which are being derived, are defined and present in the existing service definition. In this manner, existing service definitions can be identified and used to create new versions of existing services.

At 220, the service manager prompts the administrator, via the GUI tool, for configuration parameter values for configuration parameters associated with the workflows and the software products. Example types of configuration parameters and corresponding values are presented below with reference to the FIG. 4.

At 230, the service manager creates a service definition by cloning instances of the workflows and the software products having the configuration parameter values set therewith. The service definition identified via a single reference and when installed and executed provides features of the workflows and the software products as a customized service.

The service definition provides the mechanism or relationship in a formalized fashion that permits the customized service to be deployed, tested, and provided to one or more cloud processing environments having one or more workflow management systems.

According to an embodiment, at 240, the service manager generates a deployment schedule for the customized service for purposes of deploying and instantiating the service within one or more designated cloud processing environments. The deployment scheduled can be produced based on evaluation of a deployment policy.

Continuing with the embodiment of 240 and at 241, the service manager sets one or more tests to be performed by the service once that service is instantiated within the one or more designated cloud processing environments.

Continuing with the embodiment of 241 at 242, the service manager prompts the administrator, via the GUI tool, to adjust the configuration parameters based on results returned from the performance of the one or more tests. It is noted that both the values and/or the parameters associated with the values can be changed in response to performance of the tests.

Still continuing with the embodiment of 241 and at 243, the service manager logs results returned from the performance of the one or more tests as an audit trail for subsequent analysis and performance tuning of the customized service and/or performance tuning of the one or more designated cloud processing environments having the customized service.

Figure 3:
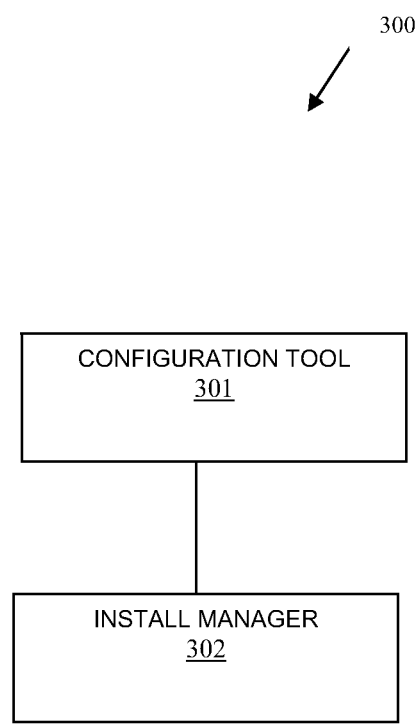
FIG. 3 is a diagram of an intelligent workload management system, according to an example embodiment.

FIG. 3 is a diagram of an intelligent workload management system 300, according to an example embodiment. The components of the workload management system 300 are implemented within and reside within a non-transitory and computer or processor-readable storage medium for purposes of executing on one or more processors of a network. The network may be wired, wireless, or a combination of wired and wireless.

The workload management system 300 implements, inter alia, the method 100 and the method 200 of the FIGS. 1 and 2, respectively.

The workload management system 300 includes a GUI tool 301 and an install manager 302. Each of these components and their interactions with one another will now be discussed in detail.

The configuration tool 301 is implemented in a non-transitory computer, processor, and/or machine-readable storage medium and executes on one or more processors of the network. Example aspects of the configuration tool 301 were presented above with reference to the method 200 of the FIG. 2.

The configuration tool 301 is configured to interact with an administrator to acquire workload and software product images for workloads and software products, respectively. The configuration tool 301 is also configured to acquire configuration settings from the administrator for the workload and product images.

The install manager 302 is implemented in a non-transitory computer, processor, and/or machine-readable storage medium and executes on one or more processors of the network. Example aspects of the install manager were presented above with reference to the methods 100 and 200 of the FIGS. 1 and 2, respectively.

The install manager 302 is configured to interact with the GUI tool 301 to package the workload and the product images along with the configuration settings as a single logical unit identified as a service image for a custom service.

According to an embodiment, the install manager 302 is also configured to manage the service image in a shared service repository that is shared with other resources over the network. Security can be enforced and customized as desired against the shared service repository.

In another case, the install manager 302 is configured to deploy the service image as an executable version of the custom service within one or more cloud processing environments. Continuing with this embodiment, the install manager is also configured to deploy the executable version of the custom service with testing and auditing capabilities as they are deployed within the one or more cloud processing environments.

Figure 4:
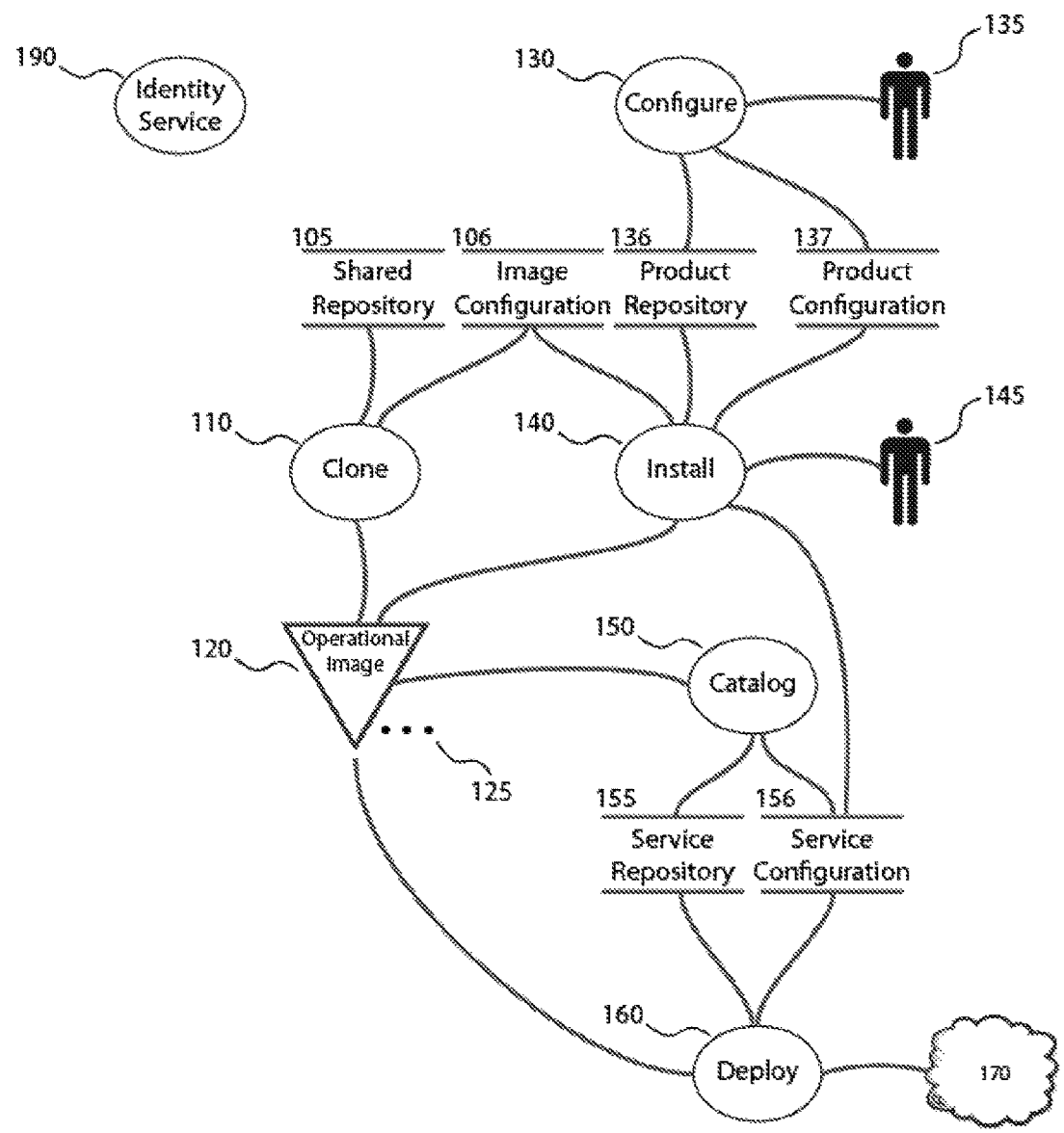
FIG. 4 is a diagram of an example architecture for managing service definitions in an intelligent workload management system, according to the techniques presented herein.

FIG. 4 is a diagram of an example architecture for managing service definitions in an intelligent workload management system, according to the techniques presented herein.

The FIG. 4 is presented for purposes of illustration and comprehension. It is to be understood that other architectural arrangements can be used to achieve the teachings presented herein and above.

The architecture of the FIG. 4 utilizes an Identity Service at 190. The identity service provides a variety of authentication and policy management services for the components described with reference to the FIG. 4.

A Shared Repository at 105 is comprised of virtual machines or workloads that are fully operational. This embodiment also provides for Image Configuration at 106, which contains configuration information concerning the workloads within 105. Examples of what 106 contain include, inter alia, the location of the HOSTS file, required Internet Protocol (IP) address configuration, default services configuration scripts, etc.

The latter embodiment also provides for the Configure at 130, where an administrator at 135 provides configuration information and product images for utilization during the install step. The Product Repository at 136 contains installable products, while the information contained in Product Configuration, at 137, contains configuration information necessary for the product to operate or annotated parameter expectations (e.g., if the product requires a Domain Name System (DNS) server address, then the product configuration at 137 indicates that the product requires a DNS server address and how that address is to be configured).

The install step, at 140, is operated by an administrator 145 and accesses the Image Configuration of 106, Product Repository at 136, and Product Configuration at 137. The Install step, at 140, can initiate the cloning step, at 110, or the cloning step, at 110, can be performed manually. The end result of the Clone step, at 110, is to provide an operational image, at 120, or operational images, at 125, which are the workloads for comprising the service. For example, an email system may require several services to be run, which the administrator wishes to be installed into 2 operational images of SUSE® Linux 11. In this case there would be two operational images at 120.

The install step further utilizes the information from 106, 136, and 137 to allow the administrator 145 to properly configure the service that is comprised of the plurality of operational images, at 120. The install step may also utilize information from the services configuration, at 156, to build upon and or maintain the service, at 156.

In an embodiment the services can be created by modifying a previous service configuration, at 156, by going through the install step, at 140. In this embodiment where a service is being modified, the existing service configuration is cloned into an operational image, at 120, using the service repository, at 155. The deployment can either be initiated from the install step, at 140, or manually from some administrator.

The install step basically allows products to be added to operational images and the administrator, at 145, to be prompted for information that resolves parameter considerations. For example, one of the operational images, at 120, may require a DNS server IP address, which the administrator 145 can either provide or indicate that a DNS server workload should provide the IP address when deployed. A start up sequencer is used if the IP addresses and other runtime information is to be shared after service instantiation. The administrator, at 145, also indicates which workloads are to be installed into each operational image.

In an embodiment, the install step, at 140, provides for a test and deployment of the operational image, at 120, so that the administrator, at 145, can evaluate the operational image of the service and make corrections via the install step, at 140, should things not work correctly.

After the operational image, at 120, or the plurality of images, at 125, are operational as far as the administrator is concerned, the Catalog step, at 150, packages up the operational images, at 120 and 125, and any configuration information from the install step, at 140, to create a Service Repository 155 and Service Configuration, at 156.

The images information stored in 155 and 156 contain all that is necessary (including startup sequence in) for the deploy step, at 160, to deploy the service into a cloud environment, at 170. This cloud environment, at 170, can be a private cloud, public cloud, and/or some hybrid cloud.

In an embodiment, each of the workloads and configuration files has an identity provided by the identity service, at 190. Therefore, the administrator, at 135 and 145, can ascertain the identity of each of the elements that is being worked on, added to, modified by, etc. before actually proceeding with the work. The identity service, at 190, also provides identities to catalog services, at 155 and 156. In an embodiment the pedigree of each workload and the service as a whole is maintained as part of 106, 137, and 156. By maintaining this pedigree the source of each workload, product, and service can be maintained in interrogated as needed.

It is well to note that the configurations and image repositories are persistent and are interactively improved as the invention functions.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
acquiring; by workload management service manager that executes on one or more processors, workload images for workloads using workload identifiers, each workload image representing a workload executable version for a particular workload;
obtaining, by the workload management service manager, product images for software products using product identifiers; each product image representing a product executable version for a particular software product;
setting, by the workload management service manager, configuration parameters for each workload and product executable version, the configuration parameters including Domain Name System (DNS) servers, security protocols, and identity services for authentication, and customizing the configuration parameters based on combinations of the workloads and the software products being assembled;
producing, by the workload management service manager, a service image for a custom service, wherein the producing includes assembling each workload and product executable version with the configuration parameters together as a single logical unit accessible from a single reference to the custom service that provides access to each workload and the product executable version, wherein producing further includes providing within the service image a startup sequencer that shares an Internet Protocol (IP) address of the service image as provided by a particular DNS server when the service image is deployed, and automatically instantiating and executing the service image on a machine as the custom service;
deploying, by the workload management service manager, the service image and testing the custom service in a cloud processing environment, wherein testing further includes scheduling and performing tests within the cloud processing environment on the service image based on automatic evaluation of an identity-based policy for an administrator; the cloud processing environment, and the custom service and determining the identity-based policy based on identities for the administrator, the cloud processing environment, and the custom service;
dynamically and interactively adjusting, by the workload management service manager over time, some of the configuration parameters based on results of the testing to modify the service image representing a modified custom service, wherein adjusting further includes dynamically enhancing the custom service through the modified service based on a dynamic feedback loop where the results from the testing are evaluated and adjustments are made to the configuration parameters defining the service image, wherein adjusting receiving from the startup sequencer runtime information and the IP address for the service image;
cataloguing, by the workload management service manager, the service image in a service repository; and
recalling, by the workload management service manager, a deployed instance of the service image and producing, by the workload management service manager, a different version of the service image by using the service image from the service repository and: altering the configuration parameters, adding new workload images, removing some of the workload images, adding new product images, and removing some of the product images.

2. The method of claim 1 further comprising, authenticating, by the workload management service manager, the workload images and the product images via workload image identities and product image identities.

3. The method of claim 2 further comprising, assigning, by the workload management service manager, a service image identity for the service image and maintaining with the service image for subsequent authentication of the custom service via the service image identity.

4. The method of claim 1 further comprising, interactively receiving, by the workload management service manager, the workload identifiers, the product identifiers, and at least some of the configuration parameters.

5. The method of claim 1, wherein setting further includes dynamically prompting, by the workload management service manager, an administrator to supply or define at least some of the configuration parameters.

6. The method of claim 1, wherein producing further includes creating a service definition data structure that establishes a relationship for cloning instances of the workloads and the software products with the configuration parameters to form the service image and recording the relationship for reuse.

* * * * *

UNITED STATES PATENT AND TRADEMARK OFFICE
CERTIFICATE OF CORRECTION

PATENT NO. : 10,114,678 B2
APPLICATION NO. : 12/789799
DATED : October 30, 2018
INVENTOR(S) : Sabin et al.

Page 1 of 1

It is certified that error appears in the above-identified patent and that said Letters Patent is hereby corrected as shown below:

In the Claims

In Column 8, Line 7, in Claim 1, delete "acquiring;" and insert --acquiring,-- therefor In Column 8, Line 14, in Claim 1, delete "identifiers;" and insert --identifiers,-- therefor In Column 8, Line 44, in Claim 1, delete "administrator;" and insert --administrator,-- therefor Signed and Sealed this
Twenty-eighth Day of May, 2019

Andrei Iancu
*Director of the United States Patent and Trademark Office*